United States Patent [19]
Gersch

[11] 4,406,194
[45] Sep. 27, 1983

[54] TOOL HOLDER
[75] Inventor: Richard C. Gersch, Traverse City, Mich.
[73] Assignee: Subco, Inc., Traverse City, Mich.
[21] Appl. No.: 217,520
[22] Filed: Dec. 17, 1980
[51] Int. Cl.³ ............................................. B23B 29/10
[52] U.S. Cl. .................................... 82/36 R; 407/45; 408/159; 408/161
[58] Field of Search ................... 82/36 R, 24 R, 24 A, 82/2 E, 1.5, 1.2, 35, 37, 27; 408/159, 179, 161, 181, 183, 184, 16; 407/45

[56] References Cited
U.S. PATENT DOCUMENTS

| | | | |
|---|---|---|---|
| 2,874,597 | 2/1959 | Bach | 408/179 |
| 2,945,404 | 7/1960 | Baumstark et al. | 82/1.2 |
| 3,051,029 | 8/1962 | Cashman et al. | 82/36 R |
| 3,190,152 | 6/1965 | Werth | 408/16 |
| 3,232,153 | 2/1966 | Davis | 82/36 R |
| 3,283,626 | 11/1966 | Alvey et al. | 82/36 R |
| 3,848,486 | 11/1974 | Robichaud | 82/36 R |
| 4,148,235 | 4/1979 | Gerth | 82/27 X |
| 4,278,372 | 7/1981 | Heisuer | 407/45 X |

Primary Examiner—James M. Meister
Assistant Examiner—Jerry Kearns
Attorney, Agent, or Firm—Price, Heneveld, Huizenga & Cooper

[57] ABSTRACT

The tool holder of the present invention provides a pivoted tool support mounted to a base and including a cam extending between the base and the pivoted holder for longitudinal movement. A drive follower extends between the cam and base to convert the longitudinal cam movement to pivotal motion of the holder with respect to the base to provide precise adjustment of a machine tool attached to an opposite end of the holder.

3 Claims, 5 Drawing Figures

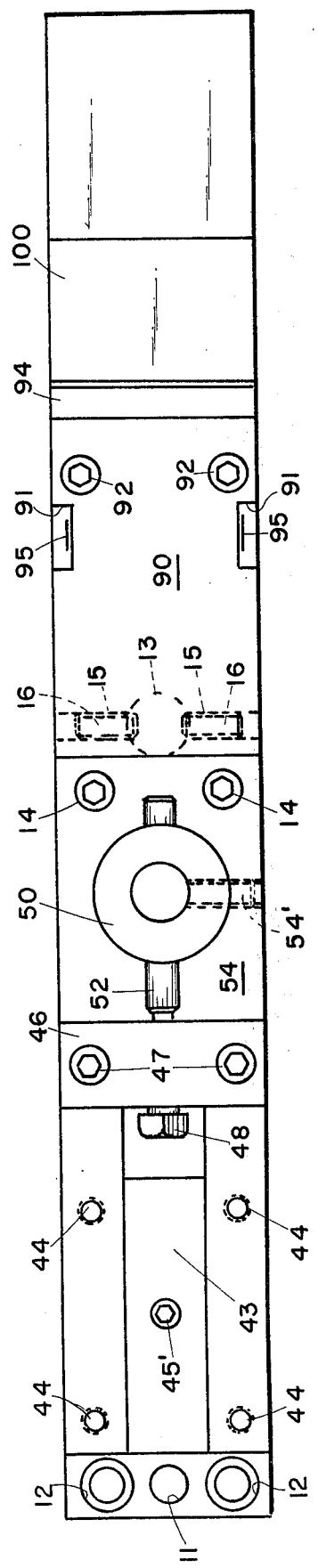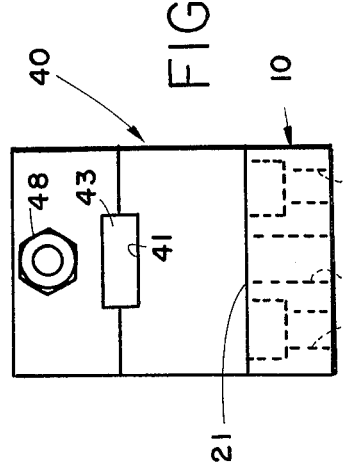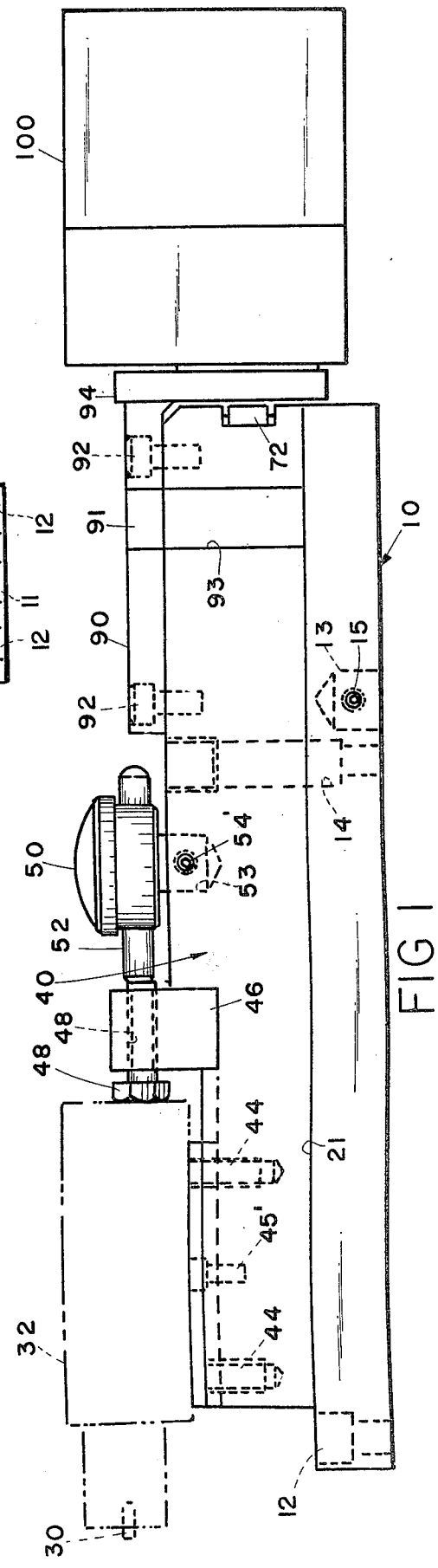

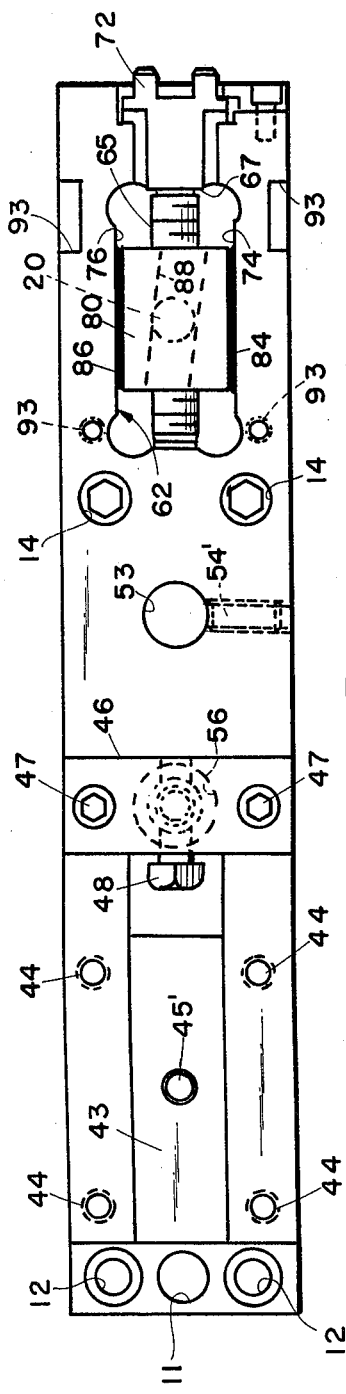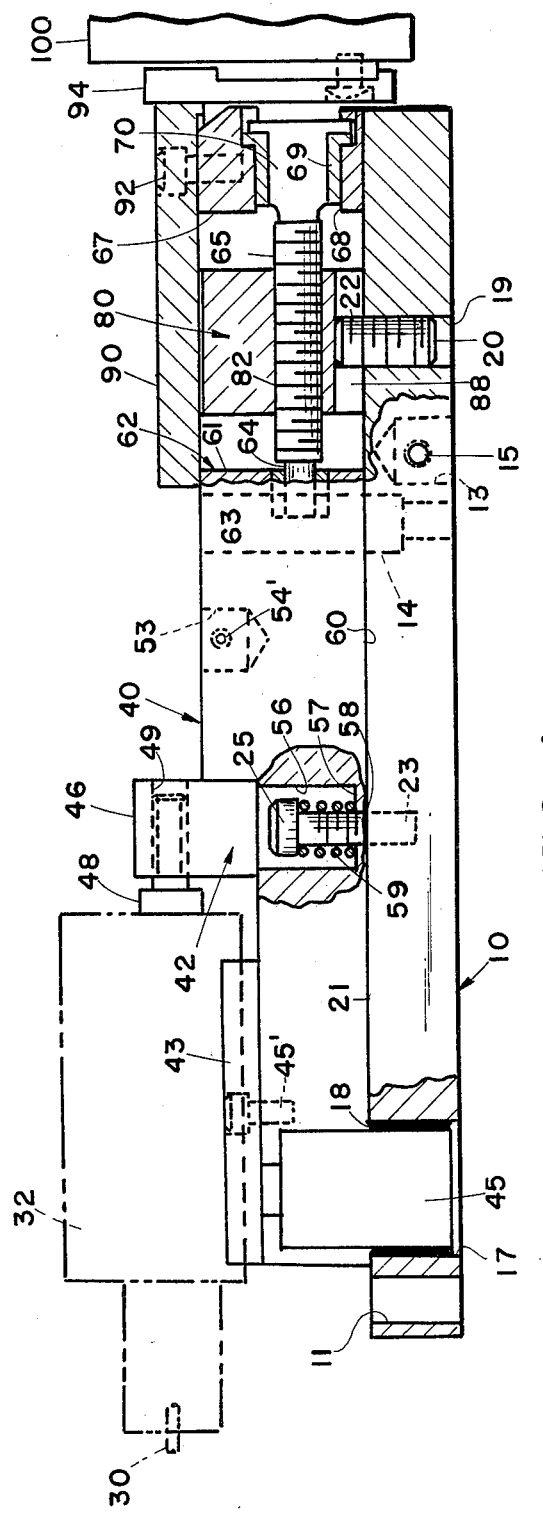

TOOL HOLDER

BACKGROUND OF THE INVENTION

The present invention relates to an adjustable machine tool support.

Machine tools for use for example in rotary cutting, boring, milling or other types of machines which engage a workpiece typically held by a rotary chuck, are adjustable to provide precise tolerances for the finished product. The tools must be periodically adjusted to compensate for tool wear or otherwise maintain the finished part within a desired tolerance range due to other factors such as tool wear, machine movement due to temperature changes and the like. A variety of existing tool holders provide such adjustments. One such tool holder is described in U.S. Pat. No. 3,654,826 issued Apr. 11, 1972 to R. C. Gersch. This device employs an eccentric sleeve driven by a reversible motor and gear arrangement for providing precise control of a cutting tool mounted to the tool block. When used in conjunction with for example, an automatic compensating system of the type described in my copending U.S. patent application Ser. No. 860,704 entitled TOOL POSITION COMPENSATING SYSTEM filed on Dec. 15, 1977, and assigned to the present assignee, the tool holder provides continuous adjustment to compensate for tool wear and also for indexing errors which may exist when used in a multi-station system.

Other tool holders employ pivoted members which pivot about an axis with the cutting element on one side of the pivot axis and an adjustment mechanism on the opposite side of the axis. The adjustment mechanism typically is set screws for movement laterally to the longitudinal axis of the pivoted tool holder or cam means which also move the end of the tool holder remote from the cutting element in a lateral direction to achieve the pivoting adjustment. Although such systems provide compact tool holders and reasonable ranges of adjustment, they do not provide the adjustment accuracy, an automatic means of adjustment and range desirable in many applications particularly where precise machining is required.

SUMMARY OF THE PRESENT INVENTION

The system of the present invention provides a tool holder pivotally mounted to a base and including cam means extending between the base and the holder and means for moving the cam such that its camming surface moves longitudinally and in turn pivots the holder in a precise manner for precision adjustments of the machine tool attached to the holder.

By providing a longitudinally movable camming surface, which in the preferred embodiment is in the form of a recess offset from the longitudinal axis of the pivoted tool holder, cams can be employed for providing a selectable range of tool adjustment as well as extremely precise tool adjustments. Further, the structure is of simplified construction and can be motor driven to provide automatic tool wear or other compensation.

These and other features, advantages and objects of the present invention will become apparent upon reading the following description thereof in connection with the accompanying drawings in which:

BRIEF DESCRIPTION OF THE DRAWINGS

FIG. 1 is a side elevational view of the tool block of the present invention;

FIG. 2 is a top plan view of the structure shown in FIG. 1;

FIG. 3 is a left end view of the structure shown in FIG. 1;

FIG. 4 is a fragmentary side elevational view of the structure of FIG. 1 shown partly in cross section; and FIG. 5 is a top plan view of the structure shown in FIG. 1 with the motor and its mounting plate removed.

DETAILED DESCRIPTION OF THE PREFERRED EMBODIMENT

Referring initially to FIGS. 1 and 4, the tool holder of the present invention includes a base or mounting means 10 which is adapted to be secured to a machine such as a boring, turning or milling machine or the like. Mounted to base 10 is a tool holer 40 which is pivoted to the base by means of a pivot pin 45 positioned near one end of the holder 40. Interengaging cam means 80 (FIGS. 4 and 5) pivot the holder 40 with respect to base 10 such that a cutting tool 30 mounted to a tool block 32 in turn secured to holder 40 can be adjusted by the pivoting of holder 40 with respect to base 10 about the axis of pivot pin 45 over a relatively wide but precisely adjustable range of from about plus or minus 0.030 inches with the adjustments being capable of precision to 0.00001 of an inch. The tool holder also includes drive means 100 coupled to the cam means 80 for providing automatic adjustment of the cutting tool if desired, although manually operated drive means could likewise be provided.

Having briefly described the basic components of the tool support of the present invention, a detailed description of each of the components and their interrelationship is now presented.

Base 10 as seen in FIGS. 1 and 2 comprises a relatively flat, elongated rectangular plate which in the preferred embodiment had a length of approximately 13 inches, a width of approximately 2.4 inches, and a height of approximately 1 inch. The block is secured to a machine by means of a pair of spaced recessed apertures 12 formed downwardly from the top surface of the block at the front end and a similar pair of spaced apertures 14 approximately ⅔ of the way towards the rear of the plate each of which are adapted to receive a hex head cap screw for securing the mounting base to the machine. In order to roughly position and align the base to the machine, a forward aperture 11 positioned between apertures 12 is provided as is an indexing aperture 13 extending upwardly from the bottom of the plate slightly to the rear of mounting apertures 14. Extending laterally inwardly to the side of aperture 13 is a pair of threaded apertures 15 for receiving set screws 16 employed for securing base 10 to an indexing pin typically an integral portion of the machine to which the tool support is secured. This provides rough adjustment of the tool support to the machine and once an alignment dowel inserted through aperture 11 into the machine and an indexing pin inserted into the aperture 13 and locked thereto, the mounting bolts extending through apertures 12 and 14 are tightened to securely mount the tool support base 10 to a machine.

For purposes of mounting and controlling the pivoted holder 40 to base 10 there is provided a forward aperture 17 having a diameter slightly greater than the diameter of the circular cross section of pivot pin 45 and extending through plate 10 as best seen in FIG. 4. Between the sidewall of aperture 17 and the cylindrical surface of pin 45 there is provided a compressed bearing material such as a bronze impregnated polytetrafluoroethylene which is commercially available and ground to precisely align and fit pivot pin 45 within aperture 17 permitting relative rotation of the pivot pin within the aperture with essentially no play. This preloaded bearing structure can be of the same type as that disclosed in U.S. Pat. No. 4,097,179, the disclosure of which is incorporated herein by reference. Near the opposite end of base 10 there is also provided an aperture 19 drilled therethrough and into which a circular cross section drive pin 20 is press fit such that an end 22 of the drive pin extends upwardly from the top surface 21 of plate 10 for engaging cam means 80 as described in greater detail below. Base 10 also includes a threaded aperture 23 (FIG. 4) positioned intermediate aperture 17 and aperture 19 for receiving a threaded cap screw 25 employed for providing a spring hold down from pivoted holder 40 with respect to base 10.

The pivoted tool holder 40 is an elongated generally rectangular block which includes at the forward end as seen in FIG. 4 an L-shaped cutaway portion 42 defining a tool receiving support. Support 42 includes a rectangular, longitudinally extending and centered keyway 41 which as best seen in FIGS. 2 and 3 receives a longitudinally extending rectangular key 43 for alignment and locking of the tool block 32 on holder 40. The floor of the support 42 has four spaced threaded apertures 44 (FIG. 2) extending downwardly therein for securing the tool support block 32 to the tool holder by recessed cap screws 45' (FIG. 4). A transversely extending end support block 46 is mounted at the corner of the L-shaped cutaway portion 42 and is secured to holder 40 by means of a pair of cap screws 47. Block 46 includes an adjustment screw 48 extending longitudinally therethrough through a threaded aperture 49. In one embodiment of the invention a dial indicator 50 (FIGS. 1 and 2) is provided and includes a feeler 52 communicating with adjustment screw 48 through aperture 49 for indicating the fore and aft or longitudinal adjustment of the cutting tool held by the tool holder. The commercially available dial indicator 50 is secured to the upper surface 54 of holder 40 by means of an aperture 53 formed downwardly through the top surface 54 and a laterally extending set screw 54' locking the dial indicator into position. Centrally positioned below end block 46 there is formed a downwardly projecting aperture 56 as best seen in FIGS. 4 and 5 for receiving cap screw 25. Aperture 56 extends partially downwardly through block 40 and includes a floor 57 through which there is provided an aperture 58 permitting the end of cap screw 25 to extend into the threaded aperture 23 in base 10. The diameter of aperture 58 is approximately ⅛" greater than the diameter of cap screw 25 to permit sufficient clearance between the cap screw and the edges of aperture 58 to permit the full range of pivoted adjustment of holder 40 with respect to base 10 pivoting about pin 45. A spring 59 is compressibly held between the head of cap screw 25 and floor 57 of aperture 56 to provide a compressive holddown force between holder 40 and base 10. Thus the lower surface 60 of holder 40 firmly engages the upper surface 21 of base 10. Both of these surfaces are machined substantially flat to provide a sliding interface between the two surfaces.

At the aft end of the tool holder 40 remote from tool block 32 there is formed a downwardly extending generally rectangular slot or cavity 62 as best seen in FIGS. 4 and 5 for housing the cam 80. Slot 62 extends through the holder 40 and includes a forward wall 61 into which there is fitted a cylindrical sleeve bearing 63 receiving an end 64 of a threaded lead screw 65 for supporting the forward end of the lead screw. The aft wall 67 of slot 62 also includes a longitudinally extending aperture 68 for receiving a sleeve bearing 69 supporting an opposite end 70 of lead screw 65. End 70 is machined with a quick disconnect coupling 72 as best seen in FIG. 5 for coupling to a mating coupling of the drive unit 100. Cam 80 is a generally rectangular block as best seen in FIGS. 4 and 5 including a threaded aperture 82 extending longitudinally through the cam for receiving lead screw 65. The sidewalls 84 and 86 of cam 80 include a compressed bearing material of the same composition as bearing material 18 associated with pivot pin 45 to prescribe the precise longitudinal movement of cam 80 between the sidewalls 74 and 76 of slot 62. Thus, sidewalls 74 and 76 are precisely machined such that cam 80 can slide in a longitudinal direction captured between these walls.

A cam follower recess 88 is formed upwardly from the bottom of cam 80 and has a width slightly less than the diameter of the end of drive pin 22 which extends into the follower recess 88. Recess 88 is machined at an angle inclined from the longitudinal axis of cam 80 at an angle to provide the desired pivoted adjustment of the holder 40. Thus, as cam 80 moves fore and aft within slot 62, by the rotation of lead screw 65, the interaction of inclined follower recess 88 with the stationary drive pin 22 forces the holder 40 to pivot with respect to base 10 either in a clockwise or counterclockwise direction as viewed from the top to effect the desired adjustment. The recess 80 is offset at an angle to translate the incremental longitudinal movement of the cam 80 into the lateral translation of the end of holder 40 over drive pin 22, an amount to provide the desired precise adjustment of the machine tool 30 held by the tool holder 40. In one embodiment of the invention, the angle of recess 88 with respect to the longitudinal axis of cam 80 was 6°-7° while the length of cam 80 was 1.5 inches. The displacement ratio of the holder 40 to the cutting tool 30 about pivot axis 45 is about 1.4. The contacting surfaces of holder 40 and base 10 are ground dead flat to permit the pivotal sliding between the plates without including undesired motion to cutter 30. If desired, the tool holder of the present invention can include different cams 80 each having a distinct follower recess angled for providing different ranges of adjustment for the tool holder. It is necessary naturally to provide the slot 62 with a longitudinal dimension substantially greater than the longitudinal length of cam 80 such that a full range of adjustment of the machanism is provided.

The drive assembly 100 includes a suitable motor and a reduction gear unit secured to the tool holder 40 by means of a horizontally extending mounting plate 90 secured to the top surface of holder 40 by means of cap screws 92 extending into suitable threaded apertures 93 formed downwardly in the tool holder. A clearance of about 0.01-0.015 inches is provided between the undersurface of plate 90 and the top surface of cam 80 such that the plate does not interfere with the motion of the cam. A downwardly depending leg 94 is secured to plate 92 and forms the mounting plate for the drive motor assembly 100 for positioning the drive assembly with its output drive shaft in axial alignment with and coupled to quick disconnect coupling 72 associated with lead screw 65. If desired, lead screw 65 can terminate in a manually operated drive handle permitting manual adjustment of the pivoted tool holder mechanism as opposed to automatic adjustment provided in the system of the preferred embodiment.

In order to initially align holder 40 to base 10, there is provided aligned slots 91 and 93 extending vertically downwardly through the opposite edges of plate 90 and holder 40 as best seen in FIGS. 1 and 2. The inner surface of these slots align with scribe marks 95 extending longitudinally on the top surface of base 10 (FIG. 2) to provide an initial set-up position for the holder with respect to the base with the cam 80 in its approximate mid position.

It will become apparent to those skilled in the art that various modifications to the preferred embodiment of the invention can be made. Such modifications may include for example mounting of the longitudinally slidable cam to the base with the drive pin mounted to the pivot plate. The relative motion of the cam with respect to the drive pin would provide a similar precisely controlled pivotal motion of the holder 40 as achieved in the preferred embodiment disclosed herein. Other modifications will also become apparent to those skilled in the art but will fall within the spirit and scope of the invention as defined by the appended claims.

The embodiments of the invention in which an exclusive property or privilege is claimed are defined as follows:

1. A tool support comprising:
    base means for attachment to a machine for performing machining operations on a workpiece;
    a machine tool holder including means for pivotally mounting said holder to said base means, said holder having means located on one side of said pivot mounting means for holding a machine tool, said holder defining an elongated slot on an opposite side of said pivot mounting means, said elongated slot being radially aligned with said pivot mounting means;
    a cam slidably received within said elongated slot for reciprocal movement toward and away from said pivot mounting means, said cam including an elongated camming surface angularly offset from radial alignment with said pivot mounting means, said camming surface being defined by an elongated recess formed in said cam, said cam including a threaded aperture radially aligned with said pivot mounting means;
    a pin member supported by said base and engaging said camming surface, said pin member comprising a stationary projection extending from said base into said recess; and
    means for reciprocably moving said cam within said slot, said means for reciprocably moving said cam including a lead screw threaded through said threaded aperture in said cam, said holder including means for rotatably supporting said lead screw, said means for reciprocably moving said cam further including a motor having a drive shaft and means for coupling said drive shaft to said lead screw, whereby said camming surface engages said pin to shift said cam tangentially with respect to said pivot mounting means to pivot said machine tool holder about said pivot mounting means.

2. A tool support comprising:
    base means for attachment to a machine for performing machining operations on a workpiece;
    a machine tool holder including means for pivotally mounting said holder to said base, said holder having means for holding a machine tool located on one side of said pivot mounting means and a cam receiving slot for slidably supporting a cam for movement with respect to said holder radially toward and away from said pivot mounting means, said slot formed in said holder on an opposite side of said pivot mounting means;
    cam means slidably positioned in said slot for reciprocal movement therein, said cam means including a camming surface, defined by an elongated recess formed in said cam means along an axis angularly offset from the direction of movement of said cam, said cam means further including a threaded aperture extending therethrough;
    pin means extending from said base means to cooperate with said camming surface for pivoting said holder about said pivot mounting means as said cam means reciprocates within said slot, said pin means comprising a stationary projection extending from said base means into said recess; and
    means for reciprocating said cam means within said slot, said means for reciprocating said cam means including a lead screw threaded through said threaded aperture in said cam means, said holder including means for rotatably supporting said lead screw, said means for reciprocating said cam means further including a motor having a drive shaft and means for coupling said drive shaft to said lead screw.

3. A tool support comprising:
    an elongated base;
    an elongated tool holder including means for pivotally mounting said holder to said base near one end of said holder, said holder including means for securing a tool block to said holder at said one end, said holder further including a slot near an opposite end of said holder remote from said one end;
    cam means extending between said holder and base and movable with respect to said holder in a direction radially toward and away from said pivot mounting means, said cam means including a portion slidably received within said slot for pivoting said holder with respect to said base about said pivot mounting means in response to the movement of said cam means, said cam means further including an elongated recess angularly offset from said slot and pin means extending from said base into said recess for pivoting said holder as said cam portion is moved, said cam means further including a threaded aperture extending therethrough; and
    means for moving said cam means to adjust the position of a tool held by said tool holder, said means for moving said cam means including a lead screw threaded through said threaded aperture in said cam means, said holder including means for rotatably supporting said lead screw, said means for moving said cam means further comprising a motor having a drive shaft and means for coupling said drive shaft to said lead screw.

* * * * *